United States Patent [19]

Jones

[11] Patent Number: 4,563,591

[45] Date of Patent: Jan. 7, 1986

[54] WAVE DRIVEN ENGINE

[76] Inventor: Dedger Jones, 885 Freeway Dr. N., Columbus, Ohio 43229

[21] Appl. No.: 526,597

[22] Filed: Aug. 26, 1983

[51] Int. Cl.$^4$ ............................................. F03B 13/12
[52] U.S. Cl. .................... 290/53; 290/42; 290/54; 60/500; 60/505; 417/330
[58] Field of Search ............ 290/1 R, 42, 43, 44, 290/52, 53, 54; 417/330, 334, 333; 60/507, 506, 505, 504, 503, 502, 501, 500, 499, 498, 497, 496, 495; 405/74, 75, 76, 78; 416/11, 84, 85

[56] References Cited

U.S. PATENT DOCUMENTS

| | | | |
|---|---|---|---|
| 1,244,309 | 10/1917 | Fox | 290/53 |
| 3,274,941 | 9/1966 | Parr | 417/331 |
| 3,965,365 | 6/1976 | Parr | 290/42 X |
| 4,076,463 | 2/1978 | Welczer | 60/497 X |
| 4,077,213 | 3/1978 | Hagen | 60/501 X |
| 4,091,618 | 5/1978 | Jackson | 417/333 X |
| 4,108,578 | 8/1978 | Corey | 60/507 X |
| 4,203,294 | 5/1980 | Budal et al. | 60/497 |
| 4,206,601 | 6/1980 | Eberle | 417/330 X |
| 4,267,695 | 5/1981 | Micciche | 60/495 X |
| 4,302,161 | 11/1981 | Berg | 60/505 X |
| 4,363,213 | 12/1982 | Paleologos | 60/505 |
| 4,413,956 | 11/1983 | Berg | 60/505 X |

FOREIGN PATENT DOCUMENTS

| | | | |
|---|---|---|---|
| 2052007 | 1/1981 | United Kingdom | 60/507 |
| 8100284 | 2/1981 | World Intel. Prop. Org. | 60/507 |

Primary Examiner—William M. Shoop, Jr.
Assistant Examiner—Shik Luen Paul Ip
Attorney, Agent, or Firm—John L. Shailer

[57] ABSTRACT

Apparatus and process for use in converting the energy of ocean waves to useful power form wherein two floats supporting a rigid structure are spaced apart to maximize the end movement of said rigid structure, and an energy extraction device preferably of the cylinder and piston type is operated by the movement of the end of said structure producing movements of four times the wave height when the two floats are spaced one-half the wave length of the wave and the energy conversion device is spaced further away from said floats by a similar amount.

10 Claims, 3 Drawing Figures

WAVE DRIVEN ENGINE

FIELD OF THE INVENTION

The invention relates to an apparatus and process for converting water wave energy to a useful power form, and more specifically pertains to the extraction of energy from ocean waves exhibiting a substantially constant wave form by means of the multiplying effect of reaching beyond the first wave encountered by said apparatus to achieve a longer and hence more useful stroke length on an energy conversion device.

BACKGROUND OF THE INVENTION

In recent years numerous attempts have been made to extract the vast quantities of energy that are contained in the oceans' waves. The studies by Gerstner in the early 1800's described the vast quantities of energy available and postulated the mechanisms by which such waves were formed. The most uniform waves are what are known as "deep ocean" waves which tend to exhibit a very constant wave by which is meant generally uniform wave height, generally a constant direction of motion of the undulating surface action of the waves, and constant spacing between wave crests characterizing a constant period of motion. The constant period of motion is also referred to as frequency and is determined by the length of time that it takes the crest or highest point of the wave to pass a fixed point in space and continuing unitl the next wave crest is encountered. The second wave crest is encountered only after a low point called the trough has passed the fixed point. The height of a wave is considered as the vertical distance between the water surface in the trough and the water surface of the crest and is twice the amplitude of a sine wave which such constant wave form substantially approximates. The period of a wave is measured in time; as, for example, a 10 second wave is a wave in which the period is equal to 10 seconds or 6 waves per minutes pass a fixed point in space. Wave height is measured in units of length, feet or meters. For convenience, deep ocean waves are approximated as sine waves since the driving effects of the wind that originally formed them has long since been dampened and approximately sinusoidal undulation of the surface is observed with a relatively constant period and constant wave height.

Many waves found in shallower bodies of water or in the areas near the shore also demonstrate a substantially constant wave form, the relative distance between wave crests being essentially constant for long periods of time when observed and measured at a specific location. Therefore, such waves although containing less energy than deep ocean waves are clearly suitable for exploitation by wave following and other energy extraction apparatus.

Several types of devices have been developed for the removal of this energy store from waves. These include wave followers which are generally of the rack and pinion or of the piston operated energy extraction devices mounted on floats. The motion of the mechanical energy conversion device is caused by the rise and fall of the wave. In this way, the motion of the device "follows" the actual vertical movement of the wave under the float. Therefore, in a wave following device, the only significant forces which are exerted on the piston are the vertical forces of buoyancy and gravity.

The typical apparatus for use in converting the energy of ocean waves into a useful power form, is the wave following type flotational devices which has a structure disposed upon the water surface and supported by two floats and in turn having a third float associated with the structure. The third float is the energy conversion device itself and such a wave following type structure operates with the two support floats being placed apart from each other in such a way that when one support float was at a wave crest, the other support float was at a wave crest and correspondingly when one support float was in a wave trough, the other support float was in a wave trough. The energy conversion float is located intermediate the two support floats. The other consequential effect of such spacing of the support floats was that when one support float was descending from a wave crest, the other support float was also descending from a wave crest. The work extractable by any device is defined as a force operating through a distance. In the case of a wave following device, the distance is defined by the wave height and the force by the buoyant force of a float floating on the surface of the water, rising and falling in response to the undulation of the wave and the forces of gravity.

An inherent limitation of said devices is that the total buoyant force can only be increased by an amount related to the volume and mass of the float. The only other facet of the work equation that can be modified is stroke length and this is limited to twice the wave height by the design of the structure.

Therefore, there is a need for an improved wave following type energy conversion device to more efficiently and beneficially extract the available energy from ocean waves, most specifically those ocean waves occurring near the shore.

SUMMARY OF THE INVENTION

A process for converting water wave energy to a useful power form wherein the waves are of the type having a substantially periodic wave form. Such waves having substantially constant wave length, constant wave height and substantially constant direction. The process includes the disposing upon the surface of the water a substantially rigid support structure with three float bodies. The first float body retains a first portion of an energy converting means. The energy converting means comprises two portions, the first portion being on the first float body, preferably a double acting cylinder, and the second portion, preferably a piston fitted to the double acting cyclinder, being in contact with the first portion and also being pivotably connected to the support structure. The second float body is spaced apart from the first float body and is rigidly connected to the support structure. The third float body is also rigidly connected to the support structure and is located intermediate to and spaced apart from the first and second float bodies. The first, second and third float bodies are spaced apart such that when the first and second float bodies are located respectively at the crests of different waves, the third float body is located in a wave trough intermediate those two wave crests. The process concludes by extracting energy by the action of the energy converting means.

An additional aspect of the invention comprises an apparatus for use in converting the energy of water waves to useful power substantially the same as the apparatus described above in carrying out the process of converting energy.

BRIEF DESCRIPTION OF THE DRAWINGS

The best mode contemplated in carrying out this invention is illustrated and better understood by reference to the following detailed description when considered in conjunction with the accompanying drawings, in which.

DETAILED DESCRIPTION OF THE INVENTION

In the present invention the floats are spaced apart in such a way that when one support float is at a wave crest the energy conversion float is at a wave crest while the other support float which is intermediate the previous two floats is located in a wave trough. Since the two support floats are fixed to the support structure in such a way as to maintain a constant relationship vertically with respect to the support structure, the support structure itself is not maintained in the horizontal position as with the prior art systems, but rather oscillates much like an oil pump jack being first in a position with the structure above the energy conversion float being at a much higher elevation than the structure immediately above either of the two support floats, while one-half wave cycle later the support structure above the energy conversion float is at a much lower elevation than the structure immediately above either of the two support floats. In this way not only the wave height is utilized for the procurement of a stroke length of a piston mounted on the energy conversion float but also the oscillating motion of the support structure is added to that wave height difference. The result is a considerable magnification of the single wave height stroke length, and in the preferred embodiment, where the two extreme floats are located on wave crests of adjacent waves the magnification factor is four. It will be appreciated that the spacing could in fact span several waves thereby producing even greater magnification effects.

The floats are retained at specific positions along the structure. However, they are movable in order to accommodate different wave length configurations, but it is clear that the central float does not necessarily need to be movable since all relative distances can be made up by the movement of the floats at the extremes of the structure. Additionally, it will be appreciated that it is not necessary to move the floats every time the wave length changes, rather the structure may be rotated so that it is not aligned with the direction of the seas or the direction of the waves but rather is at an angle to the direction of the waves sufficient that the floats fall at their appropriate positions relative to wave crests and wave troughs.

Additionally, the energy conversion device may be either of the wave following type, or may additionally incorporate the presubmergence, preloading concepts of U.S. Pat. No. 4,355,511 to Jones. Additionally, combinations of wave following and presubmergence type floats may be utilized, the wave following devices being used to produce the forces required to appropriately position and preload the presubmerged float.

Figure 1A:
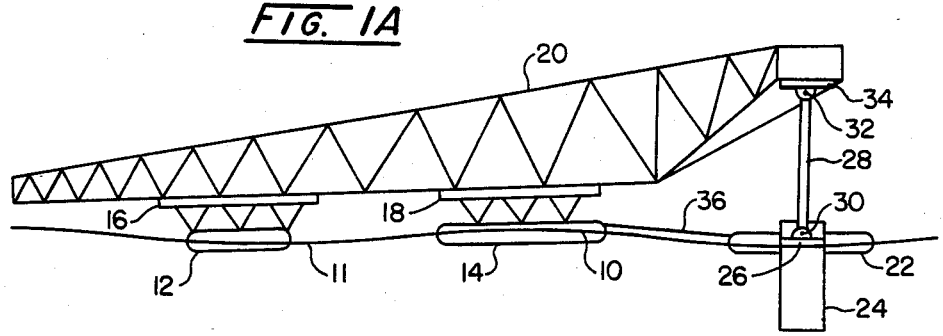
FIG. 1A depicts an apparatus for use in extracting energy in accordance with the present invention.
Figure 1B:
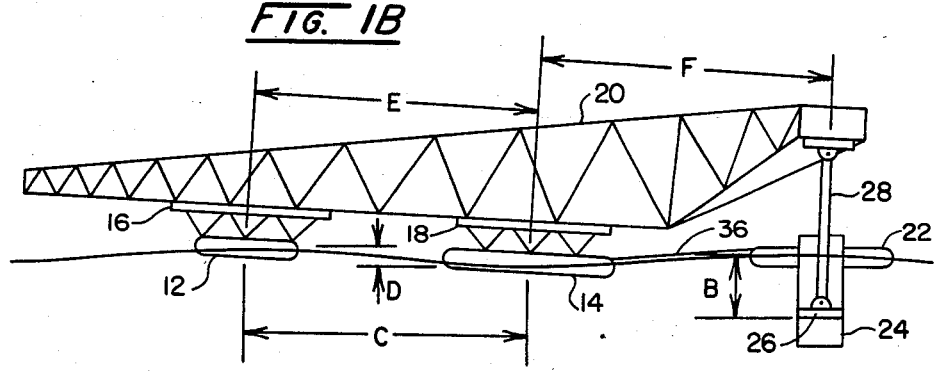
FIG. 1B is another view of the apparatus shown in FIG. 1A depicting the opposite extreme of the energy extraction cycle.

With reference to the drawings, FIGS. 1A and 1B depict the two extremes of a wave following cycle, FIG. 1A showing the piston 26 at the very top of its stroke in its associated cylinder 24 while FIG. 1B shows the piston 26 at the very bottom of its stroke in cylinder 24. Disposed on the surface of a body of water, a substantially rigid support structure 20 is supported flotationally by several floats. The structure 20 is preferably a steel structure of conventional design for structures of its type. The overall structure 20 spans at least one full wave length and is supported by two floats 12 and 14, float 12 at one end of the structure being rigidly attached to structure 20. Float 14 is near the mid-point of the structure and is rigidly attached to structure 20. Float 12 assembly is attached to structure 20 by an adjustable pad 16 and likewise float 14 is attached by adjustable pad 18. Pads 16 and 18 are adjustable to allow the assembly to be utilized on a variety of wave lengths. The preferred disposition of floats 12 and 14 is precisely one-half wave length apart; one-half wave length is represented by the dimension C. In this manner, at all times when float 12 is in a trough (as shown in FIG. 1A), float 14 must be at a wave crest and vice versa. Additionally at all times, when float 12 is rising toward the crest 10 of a wave, float 14 will always be descending toward the trough 11 of a wave. To reiterate, the best arrangement is with the floats located in proper relationship to utilize the longest wave length normally encountered in the region. Then, since the three floats are disposed in a straight line horizontally relative to one another, a shorter wave length can be effectively utilized by aligning the structure at an angle to the direction of the waves until the floats are again at their proper relationship relative to wave crests and troughs.

The energy extraction apparatus shown in FIGS. 1A and 1B is a standard piston and cylinder arrangement. Such an arrangement may also be used to operate a rack and pinion, or it may be used to operate a hydraulic generator by pumping hydraulic fluid under pressure. The piston 26 is pivotably attached by pivot joint 30 to piston rod 28 which is likewise pivotably attached to structure 20 by pivot joint 32. The cylinder 24 preferrable of the double acting type is mounted in float 22 which provides the flotation for the assembly and also acts as a guide to maintain the top of the cylinder in proper orientation while the piston descends through the cylinder. Additionally float 22 must be of sufficient weight that the cylinder and float assembly 22 and 24 is not pulled out of the water during the portion of the cycle when the piston is being withdrawn from the cylinder. The float assembly 22 is maintained at a constant distance from float 14 by means of a tether 36 which may be rigid, but may also be flexible as a cable or chain, provided the direction of current, if any, is in the direction along a line substantially parallel to the direction of a line beginning at float 14 and ending at float 22.

The floats 12 and 14 must not only have sufficient flotational capability to support the weight of structure 20, but also must be capable of maintaining their position on the surface of the water without undue submergence or withdrawal from the water in reaction to the force of the piston and cylinder arrangement. Additionally floats 12 and 14 must be ballasted either by adding weight directly to the float structure or by handing an appropriately sized counter weight from the float structure in order to allow the floats to maintain their position on the surface of the water. Float 14 must have the greatest flotational capability of the three major floats, as well as the greatest level of ballasted in order for it to be capable of maintaining its position on the surface of the water being neither unduly submerged nor removed above the water surface by the actions of the piston and cylinder on the energy extraction float 22. Float 14 preferably has a net flotational capacity of at least the sum of the flotational capacities' of floats 12 and 22. Additionally, note that the piston rod 28 is mounted to a horizontally adjustable pad 34, again so that the appropriate spacing to maximize the use of the wave form can be achieved, and maintained.

Taking a look at the specific dimensioning of the structure shown in FIGS. 1A and 1B, dimension C is approximately one-half the wave length of the near shore ocean wave while dimension D is the wave height. In FIG. 1A, the piston 26 is at its uppermost position as described above while in FIG. 1B the piston 26 is at its lowermost point in its stroke. The distance B is the distance from the uppermost to lowermost point of operation of piston 26 within the cylinder 24. The distance B is equal to four times the distance D. One-half of the total stroke length B is provided by the lever type action of the structure 20, the distance D being the vertical drop distance between float 12 and float 14, and since distance E and F are equal to each other in the embodiment shown in FIGS. 1A and 1B, the multiplicative factor 2 times the drop distance D which is also the wave height means that 2 times the wave height must go into the maximum stroke length and is therefore a portion of the distance B. Additionally, taking a line through the centers of buoyancy of floats 12 and 14 reveals that twice the wave height is also added to the distance B by the motion of the float 22 upwardly by one wave height and the pivot point 32 being moved downwardly by one wave height thereby adding two more wave heights into the distance B producing a final sum of four times the wave height.

The dimension E represents the distance between the vertical center lines of floats 12 and 14. In its most preferred form, that distance is equal to C, or one-half the wave length of the wave. In any event, it is preferred that the dimension E by a multiple of dimension C where the multiplying factor is an odd integer. Being an odd integer, the two floats will always be at opposite extremes regarding the wave crest 10 and the wave trough 11. The dimension F likewise is a multiple of the dimension C which is one-half the wave length. Again, the multiplicative integer relating F and C is an odd integer. In the embodiment shown in FIGS. 1A and 1B, F is equal to C or the multiplying factor is one. If E and F are equal to each other and equal to one-half the wave length respectively, then the minimal length of piston rod 28 is 4 times the wave height D in a straight wave following device. This is a significant increase over the prior art situation where floats 14 and 22 are reversed. In such a prior art device, the float 22 being energy extracting float is intermediate the two support floats. The piston of this prior art device has a total stroke length of only two times the wave height, because the structure moves up and down one wave height and these two wave height differences are additive. Since in the embodiment shown in FIGS. 1A and 1B of the present disclosure the apparatus from one extremity to the point of energy extraction covers twice the wave distance as that shown in the referenced patent. It will be appreciated that if the distance F were three times C, the stroke length would be 8 times the wave height D. However, significant difficulties in constructing a structure and in the height such a structure not dip into the water render it faily impractical to operate with the distances E and F as other than equal to each other.

Since buoyancy is related to the size and density of the float in question, for a given size and displacement of float 22 with cylinder 24 in position, the buoyant force retaining float 22 in its position on the surface of the water is a relative constant. However, since the stroke length of the piston has been magnified to 4 times the wave height, twice the energy may be extracted from a wave front utilizing an energy extraction apparatus and floating support structure as shown in FIGS. 1A and 1B over previously disclosed wave following devices.

Figure 2:
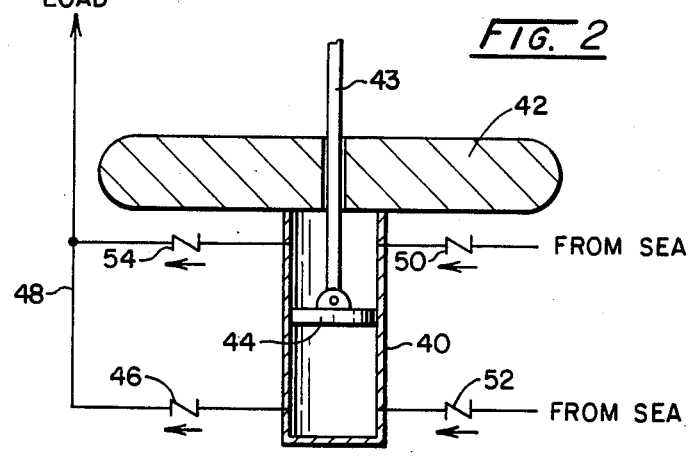
FIG. 2 is a schematic diagram of the operation of the energy converting means.

With reference to FIG. 2, a double acting cylinder 40 is mounted on the energy conversion float 42 which is in the location relative to the support floats as previously described. A piston 44 is mounted within double acting cylinder 40 so that water of hydraulic fluid will be compressible on either the up or down strokes of piston 44. On the down stroke the hydraulic fluid or water in the lower portion of cylinder 40 is compressed and forced out of the cylinder body and through check valve 46 and into high pressure line 48. At the same time water from the sea or from a low pressure hydraulic accumulator is admitted to the upper portion of the double acting cylinder 40 through check valve 50. During this same down stroke check valves 52 and 54 are in the closed position, check valve 52 preventing loss of high pressure fluid back to the sea or to the low pressure accumulator and check valve 54 preventing the degradation of pressure in high pressure line 48 into the low pressure portions of the double acting cylinder 40.

On an up stroke of piston 44 the sequencing and operation of the valves will be reversed so that the high pressure fluid in the upper portion of the cylinder is also transferred to high pressure line 48. From high pressure line 48 the high pressure hydraulic fluid or water may be carried to the hydraulic loads which may be on shore or may be mounted on structures nearby or connected to the main support structure of the wave following energy conversion device. The uses of the hydraulic fluid in generating energy, running electrical generators, or in operating a pre-loading system on the energy conversion floats themselves are many and varied. Once produced the high pressure hydraulic fluid is available for any energy consuming load. It will be appreciated that the hydraulic flow and pressure may be smoothed out to avoid peaks and valleys in the pressure from the reciprocating action of the double acting cylinder and piston by techniques known to those familiar with the art of hydraulic power systems.

It will be apparent from the above description that this invention provides for multiplying the available stroke length in a wave following piston and cylinder type wave energy conversion device. The energy converting float is spaced apart from two structure support floats that are adjacent one another and which are spaced to provide for the reciprocating motion of the whole structure which pivots about the moving central support float.

Having thus described this invention, what is claimed is:

1. A process for converting water wave energy to a useful power form wherein said waves are of the type having a substantially periodic waveform including substantially constant wave length, wave height and direction,
comprising the steps of:
disposing on the surface of the water a substantially rigid horizontally oriented support structure having a length and two ends, three float bodies being disposed along the length of said support structure, a first float body residing substantially adjacent the first end of said support structure, a second float body spaced apart from said first float body and residing substantially adjacent the second end of said support structure, a third float body spaced apart from both the first and second float bodies and residing between said first and second float bodies along the length of said support structure;
retaining a first portion of an energy converting means in said first float body, a second portion of said energy converting means being pivotably connected to said support structure substantially at the first end of said support structure and being in contact with the first portion of said energy converting means;
rigidly connecting said second float body to the second end of said support structure, and rigidly connecting said third float body to the center of the length of said support structure intermediate said second float body and the second portion of said energy converting means, said second and third float bodies being support floats and said first float body with energy converting means not being a support float;
spacing said first, second and third float bodies along the length of said support structure such that when said first and second float bodies are located respectively at the crests of different sequential waves, said third float body is located in a wave trough intermediate said wave crests, the first end of said support structure is oscillated vertically by the movement of the support structure as it follows the movement of said second and third float bodies which are spaced apart one-half wave length from each other, said second portion of said energy converting means moving against said first portion of said energy converting means because of the combination of the oscillation of the first end of said support structure with second portion of said energy converting means and the wave following movement vertically of said first float body, which combination multiplies the effect of said wave height;
converting energy by the movement of said first and second portions of said energy converting means against each other.

2. The process according to claim 1 wherein said first portion of said energy converting means is a cylinder, and further wherein said second portion of said energy converting means is a piston.

3. The process according to claim 1 wherein said first and second float bodies are spaced apart a distance substantially equal to one wave length of said waves and in a direction substantially parallel to the direction of said waves, said third float body being disposed in an intermediate position relative to said first and second float bodies.

4. The process according to claim 3 wherein said second and third float bodies are spaced apart a distance substantially equal to one-half the wave length of said waves and in a direction substantially parallel and coincident with a line through said first and second float bodies.

5. The process according to claim 1 wherein the space between said first, second, and third float bodies may be varied.

6. An apparatus for use in converting the energy of water waves to a useful power form wherein said waves exhibit a substantially periodic wave form having a substantially constant wave length, wave height, and direction, wherein said apparatus acts to multiply the effect of said wave height; comprising:
a first support float;
a second support float spaced apart from said first support float;
a first buoyant body spaced apart from said first and second support floats;
means for converting energy moveably attached to said first buoyant body;
a substantially rigid support structure having a length and two ends rigidly connected to said first support float substantially adjacent to the first end of and rigidly connected to said second support float at the center of the length between the two ends,
said energy converting means also being pivotably attached to and substantially adjacent the second end of said support structure.

7. The apparatus according to claim 6 wherein said first buoyant body further comprises a cylinder.

8. The apparatus according to claim 7 wherein said energy converting means is a piston engaging said buoyant cylinder.

9. The apparatus according to claim 8 wherein the length of said cylinder and said piston have a length equal to at least 4 times the wave height of said waves.

10. The apparatus according to claim 6 further comprising means to adjust the spacing between said first and second support floats, and means to adjust the spacing between said second support float and said pivotal attachment of said energy converting means at the second end of said support structure.

* * * * *